US008545029B2

(12) United States Patent
Ma et al.

(10) Patent No.: US 8,545,029 B2
(45) Date of Patent: Oct. 1, 2013

(54) HYBRID HIGH PRESSURE MERCURY ARC LAMP-LASER LIGHT PRODUCTION SYSTEM

(75) Inventors: Joseph Ma, Waterloo (CA); Robert Rushby, Cambridge (CA)

(73) Assignee: Christie Digital Systems USA, Inc., Kitchener, ON (CA)

( * ) Notice: Subject to any disclaimer, the term of this patent is extended or adjusted under 35 U.S.C. 154(b) by 178 days.

(21) Appl. No.: 13/094,203

(22) Filed: Apr. 26, 2011

(65) Prior Publication Data

US 2012/0274908 A1 Nov. 1, 2012

(51) Int. Cl.
*G03B 21/26* (2006.01)

(52) U.S. Cl.
USPC .............................................. 353/94; 353/84

(58) Field of Classification Search
USPC ................. 353/30, 38, 84, 94, 122; 348/757, 348/780; 362/259, 553
See application file for complete search history.

(56) References Cited

U.S. PATENT DOCUMENTS

| | | | |
|---|---|---|---|
| 6,398,389 B1 * | 6/2002 | Bohler et al. | 362/293 |
| 6,561,654 B2 * | 5/2003 | Mukawa et al. | 353/31 |
| 6,688,747 B2 * | 2/2004 | Wichner et al. | 353/29 |
| 6,698,892 B2 * | 3/2004 | Peterson | 353/29 |
| 6,807,010 B2 * | 10/2004 | Kowarz | 359/634 |
| 6,843,566 B2 * | 1/2005 | Mihara | 353/29 |
| 6,988,806 B2 * | 1/2006 | Slobodin et al. | 353/31 |
| 7,035,015 B2 * | 4/2006 | Teijido | 359/649 |
| 7,090,357 B2 * | 8/2006 | Magarill et al. | 353/94 |
| 7,204,605 B2 * | 4/2007 | Kanayama et al. | 362/230 |
| 7,468,844 B2 * | 12/2008 | Hall, Jr. | 359/634 |
| 7,515,343 B2 * | 4/2009 | Edlinger et al. | 359/629 |
| 7,520,624 B2 * | 4/2009 | Lippey et al. | 353/85 |
| 2002/0044445 A1 * | 4/2002 | Bohler et al. | 362/293 |
| 2002/0154277 A1 * | 10/2002 | Mukawa et al. | 353/31 |
| 2002/0186349 A1 * | 12/2002 | Wichner et al. | 353/29 |
| 2002/0186350 A1 * | 12/2002 | Peterson | 353/29 |
| 2003/0156330 A1 * | 8/2003 | Edlinger et al. | 359/618 |
| 2003/0179346 A1 * | 9/2003 | Mihara | 353/31 |
| 2004/0174501 A1 * | 9/2004 | Slobodin et al. | 353/94 |
| 2005/0013132 A1 * | 1/2005 | Kim et al. | 362/231 |
| 2005/0105176 A1 * | 5/2005 | Lippey et al. | 359/443 |
| 2005/0134811 A1 * | 6/2005 | Magarill et al. | 353/94 |
| 2005/0174658 A1 * | 8/2005 | Long et al. | 359/833 |
| 2006/0077357 A1 * | 4/2006 | Yoshida et al. | 353/84 |
| 2007/0165409 A1 * | 7/2007 | Shimaoka et al. | 362/299 |
| 2009/0268102 A1 * | 10/2009 | Barazza | 348/744 |

* cited by examiner

*Primary Examiner* — Georgia Y Epps
*Assistant Examiner* — Bao-Luan Le
(74) *Attorney, Agent, or Firm* — Perry + Currier

(57) ABSTRACT

A light production system for a projector is provided. The light production system comprises: at least one high pressure mercury arc lamp; at least one red laser; at least one green laser; and an integrator for receiving and combining light from the at least one high pressure mercury arc lamp, red light from the at least one red laser and green light from the at least one green laser, the integrator comprising an output enabled to emit combined light into illumination relay optics of the projector.

18 Claims, 12 Drawing Sheets

HYBRID HIGH PRESSURE MERCURY ARC LAMP-LASER LIGHT PRODUCTION SYSTEM

FIELD

The specification relates generally to projectors, and specifically to a hybrid high pressure mercury arc lamp-laser light production system for a projector.

BACKGROUND

In digital cinema projectors, xenon (Xe) lamps are generally used as the major light source due to their high luminous flux and good color gamut. High pressure mercury arc lamps are not usually chosen in cinema application due to their red deficiency, however, they have very high luminous efficacy (>60 lm/W) when compared with Xe lamps (30-50 lm/W).

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
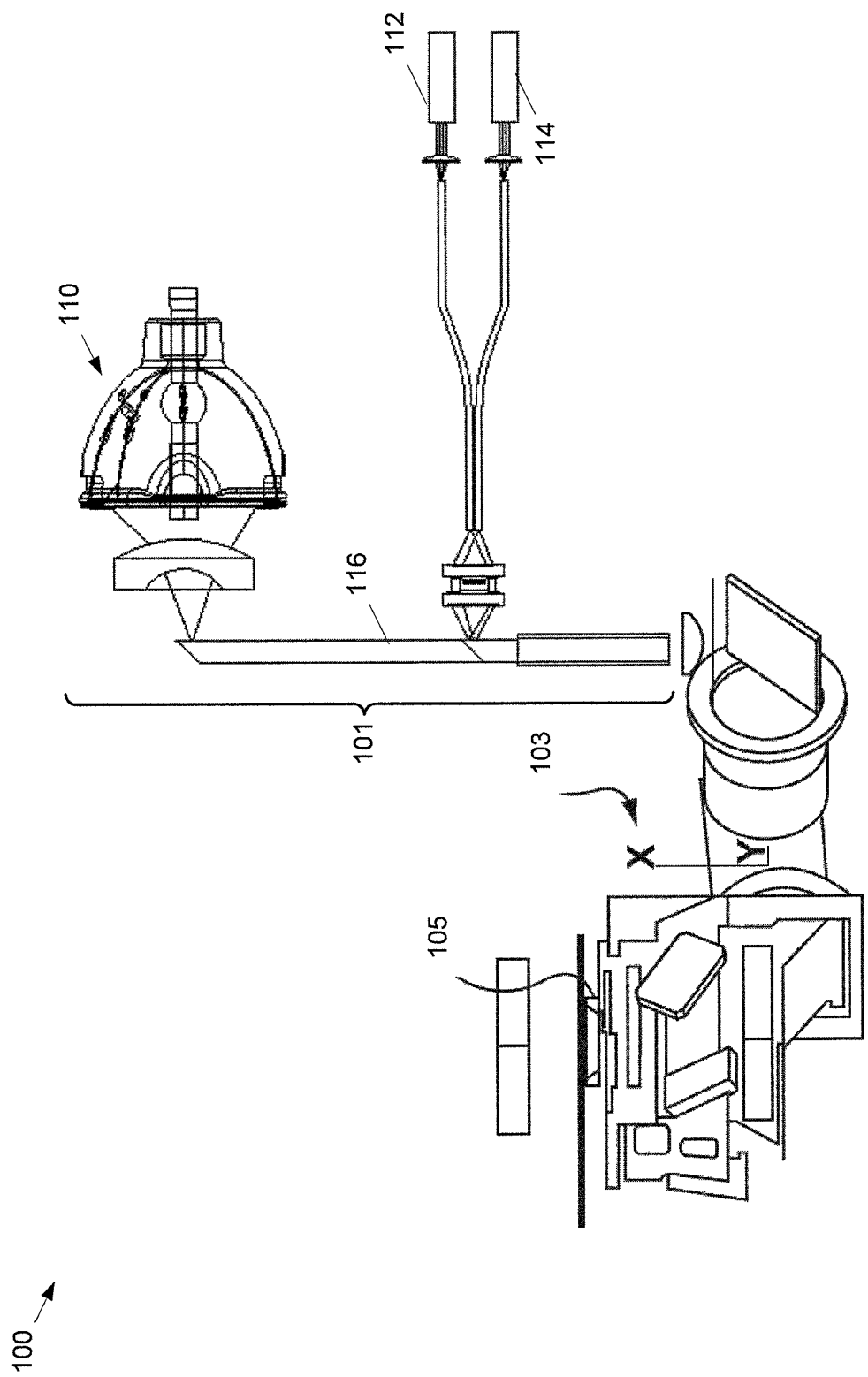
FIG. 1 depicts a digital projector having a hybrid high pressure mercury arc lamp-laser light production system, according to non-limiting implementations.

An aspect of the specification provides a light production system for a digital projector comprising: at least one high pressure mercury arc lamp; at least one red laser; at least one green laser; and an integrator for receiving and combining light from the at least one high pressure mercury arc lamp, red light from the at least one red laser and green light from the at least one green laser, the integrator comprising an output enabled to emit combined light into illumination relay optics of the digital projector.

The integrator can further comprise a first light entrance for receiving the light from said at least one high pressure mercury arc lamp, and at least a second light entrance for receiving the red light and the green light.

The integrator can further comprise at least one of an integrating rod and a hollow pipe with interior mirrored wall surfaces.

A ratio of the at least one red laser to the at least one high pressure mercury arc lamp can depend on wattage of the at least one high pressure mercury arc lamp and power of the at least one red laser. The ratio of the at least one red laser to the at least one high pressure mercury arc lamp can be different than 1 to 1. The ratio of the at least one red laser to the at least one high pressure mercury arc lamp can be 3 to 1. Similarly, a ratio of the at least one green laser to the at least one high pressure mercury arc lamp can depend on wattage of the at least one high pressure mercury arc lamp and power of the at least one green laser. The ratio of the at least one green laser to the at least one high pressure mercury arc lamp can be different than 1 to 1. The ratio of the at least one green laser to the at least one high pressure mercury arc lamp can be one of 2 to 1 and 3 to 1, and wherein each the red laser comprises a 638 nm laser and each the green laser comprises a 532 nm laser.

Each red laser can comprise a 638 nm laser and each green laser can comprise a 532 nm laser.

The light production system can further comprise a first fibre optic cable for routing the red light from the red laser to the integrator and a second fibre optic cable for routing the green light from the green laser to the integrator.

The light production system can further comprise: a double notch filter proximal to an entrance of the integrator, the double notch filter comprising a first band pass for receiving and transmitting the red light and a second band pass for receiving and transmitting the green light, and substantially reflecting given light outside of each of the first band pass and the second band pass; and a fold mirror for reflecting the light from the at least one high pressure mercury arc lamp towards the double notch filter, the fold mirror, the double notch filter and the entrance arranged relative to one another such that the red light and the green light passes through the double notch filter and into the entrance, and light from the at least one high pressure mercury arc lamp outside of the first band pass and the second band pass is reflected from the double notch filter and into the entrance. The light production system can further comprise a respective double notch filter, a respective fold mirror, at least one respective red laser, at least one respective green laser, and at least one respective entrance at the integrator for each of the at least one high pressure mercury arc lamps. The light production can further comprise an optical apparatus for receiving the light from the at least one high pressure mercury arc lamp transmitted by the double notch filter and relaying the light from the at least one high pressure mercury arc lamp transmitted by the double notch filter back through the double notch filter and into the entrance. The optical apparatus can comprise at least one of: at least one optical fibre; an arrangement of mirrors; and, an arrangement of lenses.

The light production can further comprise a yellow filter for reducing yellow light from the at least one high pressure mercury arc lamp. The yellow filter can located at one or more of the output, between the at least one high pressure mercury arc lamp and an entrance to the integrator, and in the illumination relay optics.

The illumination relay optics can comprise at least one of a dichroic filter and a bandpass filter for further filtering the combined light.

Another aspect of the specification provides a projector. The projector comprises a light production system comprising: at least one high pressure mercury arc lamp; at least one red laser; at least one green laser; and an integrator for receiving and combining light from the at least one high pressure mercury arc lamp from the at least one high pressure mercury arc lamp, red light from the at least one red laser and green light from the at least one green laser, the integrator comprising an output enabled to emit combined light. The projector further comprises: illumination relay optics for receiving the combined light from the integrator; an imaging component for receiving light from the illumination relay optics and causing the combined light to be formed into an image, the illumination relay optics arranged to relay light to the imaging component; and at least one projection component for accepting the image from the imaging component and projecting the image.

The integrator can further comprise a first light entrance for receiving the light from the at least one high pressure mercury arc lamp, and at least a second light entrance for receiving the red light and the green light.

A ratio of the at least one red laser to the at least one high pressure mercury arc lamp can depend on wattage of the at least one high pressure mercury arc lamp and power of the at least one red laser. The ratio of the at least one red laser to the at least one high pressure mercury arc lamp can be different than 1 to 1. The ratio of the at least one red laser to the at least one high pressure mercury arc lamp can be 3 to 1. Similarly, a ratio of the at least one green laser to the at least one high pressure mercury arc lamp can depend on wattage of the at least one high pressure mercury arc lamp and power of the at least one green laser. The ratio of the at least one green laser to the at least one high pressure mercury arc lamp can be different than 1 to 1. The ratio of the at least one green laser to the at least one high pressure mercury arc lamp can be one of 2 to 1 and 3 to 1, and wherein each the red laser comprises a 638 nm laser and each the green laser comprises a 532 nm laser.

The projector can further comprise: a double notch filter proximal to an entrance of the integrator, the double notch filter comprising a first band pass for receiving and transmitting the red light and a second band pass for receiving and transmitting the green light, and substantially reflecting given light outside of each of the first band pass and the second band pass; and a fold mirror for reflecting the light from the at least one high pressure mercury arc lamp towards the double notch filter, the fold mirror, the double notch filter and the entrance arranged relative to one another such that the red light and the green light passes through the double notch filter and into the entrance, and the light from the at least one high pressure mercury arc lamp outside of the first band pass and the second band pass is reflected from the double notch filter and into the entrance. The projector can further comprise a respective double notch filter, a respective fold mirror, at least one respective red laser, at least one respective green laser, and at least one respective entrance at the integrator for each of the at least one high pressure mercury arc lamps. The projector can further comprise an optical apparatus for receiving the light from the at least one high pressure mercury arc lamp transmitted by the double notch filter and relaying the light from the at least one high pressure mercury arc lamp transmitted by the double notch filter back through the double notch filter and into the entrance.

The projector can further comprise a yellow filter for reducing yellow light from the at least one high pressure mercury arc lamp, wherein the yellow filter is located at one or more of the output, between the at least one high pressure mercury arc lamp and an entrance to the integrator, and in the illumination relay optics.

FIG. 1 depicts a digital projector 100 comprising a light production system 101, illumination relay optics 103, an imaging component 105 and a projection component (not pictured), according to non-limiting implementations. Light production system 101 comprises at least one high pressure mercury arc lamp 110, at least one red laser 112 (referred to hereafter as red laser 112), at least one green laser 114 (referred to hereafter as green laser 114) and an integrator 116. It is appreciated that integrator 116 is enabled to receive and combine light from each of high pressure mercury arc lamp 110, red laser 112 and green laser 114 and emit combined light into illumination relay optics 103 (referred to hereafter as optics 103), which relays the combined light to imaging component 105. Imaging component 105 forms the combined light into an image which is then projected by the projection component.

Figure 2:
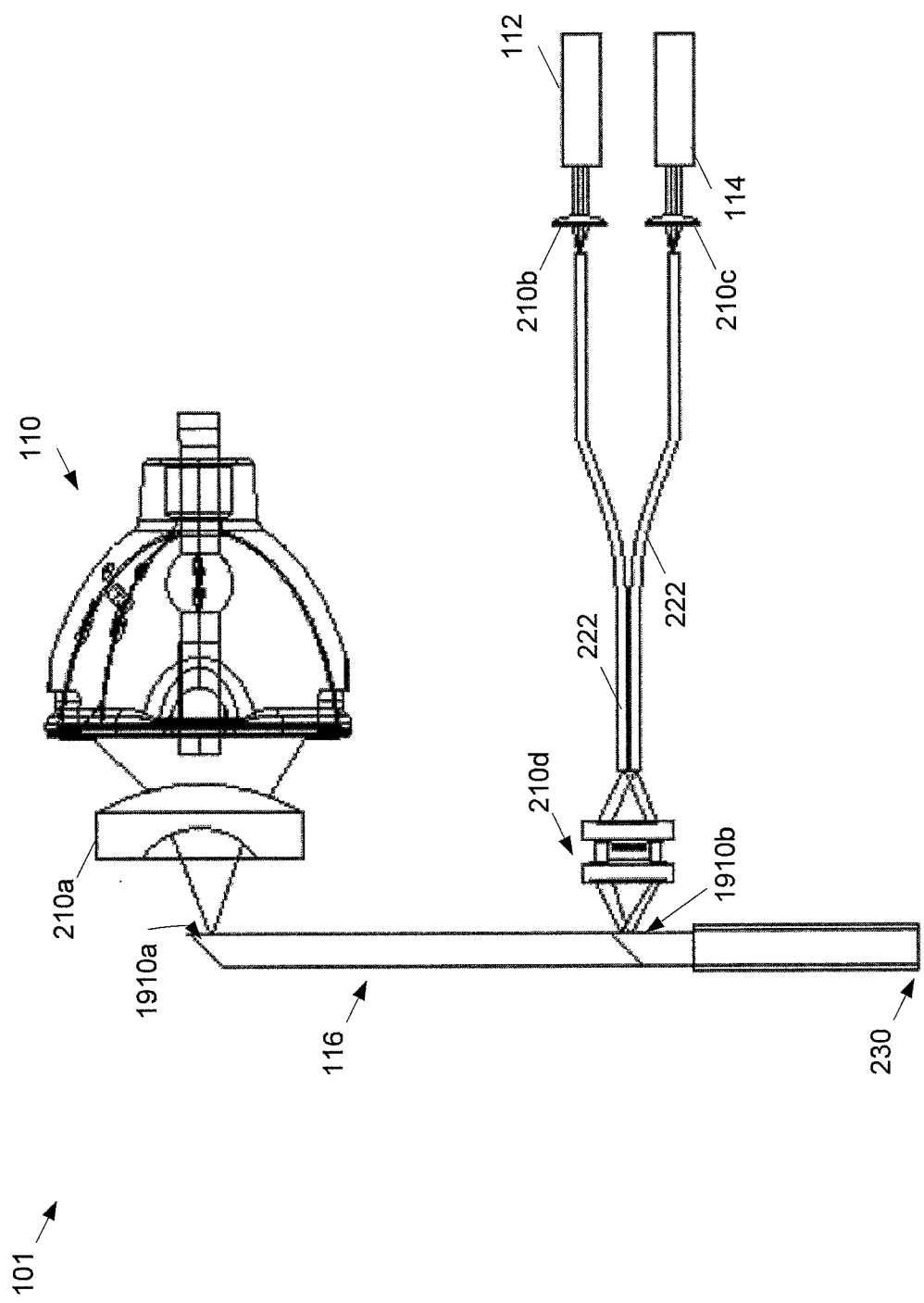
FIG. 2 depicts a hybrid high pressure mercury arc lamp-laser light production system, according to non-limiting implementations, according to non-limiting implementations.

Attention is now directed to FIG. 2 which depicts light production system 101 in more detail, including high pressure mercury arc lamp 110, red laser 112, green laser 114 and integrator 116. From FIG. 2 it is appreciated that light production system 101 further comprises a plurality of lenses 210a, 210b, 210c, 210d for focussing and/or adjusting the cone angle of light from high pressure mercury arc lamp 110 and light from red laser 112 and green laser 114 onto entrance faces 1910a, 1910b of integrator 116, as described below with reference to FIG. 3. Light production system 101 further comprises fibre optics 222 to relay light respectively from red laser 112 and green laser 114 to entrance face 1910b, with lenses 210d for focusing light emitted from fibre optics 222 onto entrance face 1910b. It is appreciated that integrator 116 combines light from high pressure mercury arc lamp 110, red laser 112, and green laser 114 which is then emitted at output 230 and into relay illumination optics 103. It is appreciated that light from each laser can be relayed to entrance face 1910b by separate fibre optics 222.

In specific non-limiting implementations, high pressure mercury arc lamp 110 comprises a given 350 W UHP™ high pressure mercury arc lamp. Furthermore, it is appreciated that high pressure mercury arc lamp 110 can be any suitable high pressure mercury arc lamp including but not limited to an Ultra-High-Performance (UHP™) lamps from Philips, NSH™ lamps from Ushio and VIP™ lamps from Osram, or the like. Furthermore, in these specific non-limiting implementations, red laser 112 comprises a red laser diode which emits light at approximately 638 nm, with a FWHM (full width, half maximum) of 2 nm, at 5 W per unit. Furthermore, in these specific non-limiting implementations, green laser 114 comprises a green laser diode which emits light at approximately 532 nm, with a FWHM of 1 nm, at 3 W per unit. In addition, in these specific non-limiting implementations, light production system 101 comprises one high pressure mercury arc lamp 110, three red lasers 112, and two green lasers 114. However, the number and ratio of high pressure mercury arc lamps to red lasers and green lasers is not to be considered particularly limiting and any suitable number of high pressure mercury arc lamps, red lasers and green lasers that are compatible with a given integrator and color space, as described below, are within the scope of given implementations.

Indeed, it is appreciated that a ratio of the at least one red laser 112 to the at least one high pressure mercury arc lamp 110 can depend on wattage of the at least one high pressure mercury arc lamp 110 and power of the at least one red laser 110. The ratio of the at least one red laser 112 to the at least one high pressure mercury arc lamp 112 can be different than 1 to 1. The ratio of the at least one red laser 112 to the at least one high pressure mercury arc lamp 110 can be 3 to 1. Similarly, a ratio of the at least one green 114 laser to the at least one high pressure mercury arc lamp 110 can depend on wattage of the at least one high pressure mercury arc lamp 110 and power of the at least one green laser 114. The ratio of the at least one green laser 114 to the at least one high pressure mercury arc lamp 110 can be different than 1 to 1. The ratio of the at least one green laser 114 to the at least one high pressure mercury arc lamp 110 can be one of 2 to 1 and 3 to 1, and wherein each the red laser comprises a 638 nm laser and each the green laser 114 comprises a 532 nm laser.

Furthermore, while present implementations are described with reference to red a and green laser diodes, any suitable red and green lasers are within the scope of present implementations.

Figure 3:
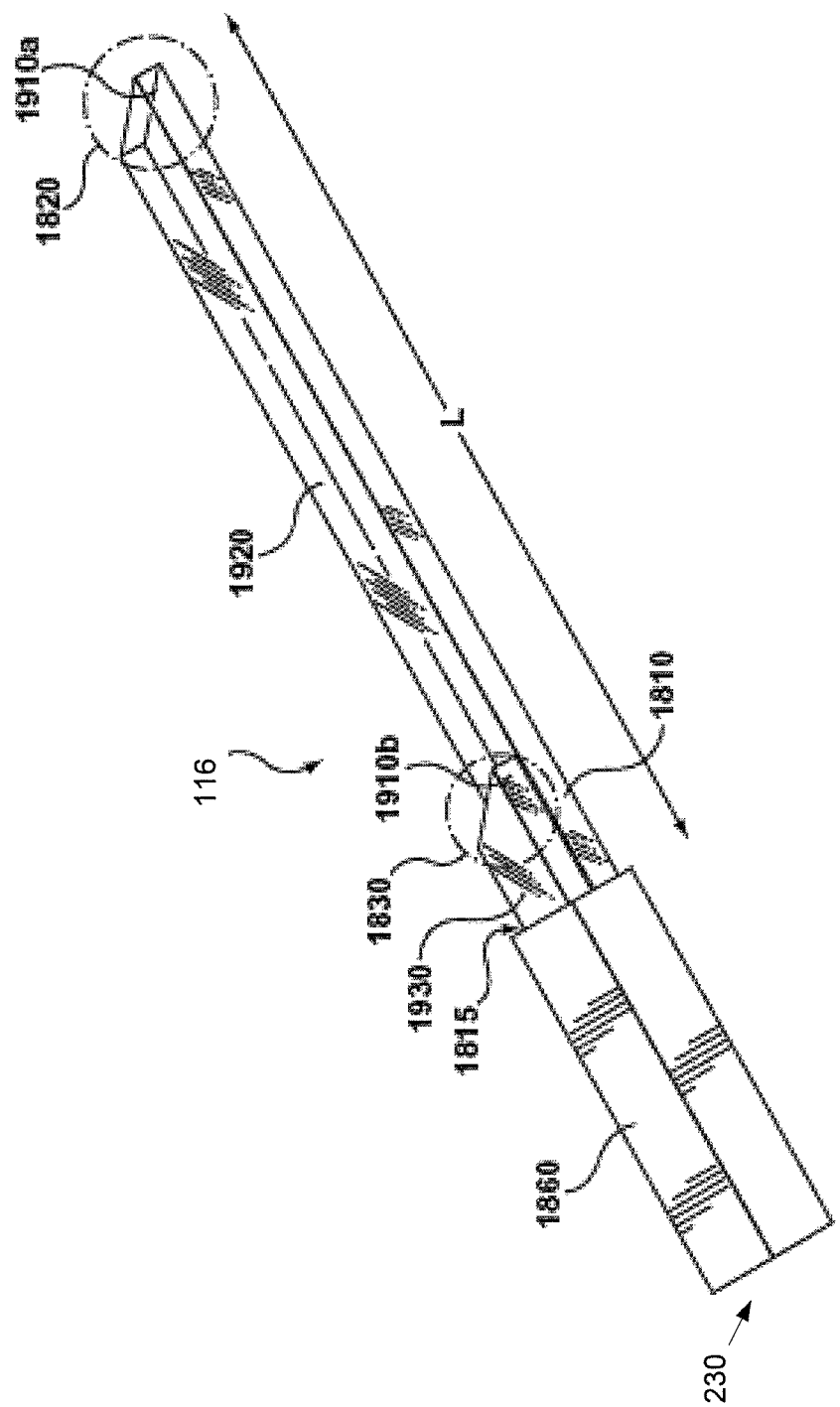
FIG. 3 depicts an integrator used in the hybrid high pressure mercury arc lamp-laser light production system of FIG. 2, according to non-limiting implementations.

Attention is now directed to FIG. 3 which depicts integrator 116, according to non-limiting implementations. Examples of integrator 116 are disclosed in detail in Applicant's US Patent Application having Patent No. US 2009-0168448, incorporated herein by reference. Integrator 116 comprises a body 1810 for integrating light, body 1810 comprising an integrating rod having a length L. In some implementations, length L is suitable for integrating light that enters body 1810. Body 1810 also comprises a light egress end 1815. Integrator 116 further comprises a first light entrance device 1820 for accepting light from high pressure mercury arc lamp 110 into body 1810. First light entrance device 1820 comprises light entrance face 1910a. First light entrance device 1820 is located distal from light egress end 1815. Integrator 116 further comprises a second light entrance device 1830 for accepting light from red laser 112 and green laser 114 into body 1810. Second light entrance device 1830 comprises a second light entrance face 1910b. Second light entrance device 1830 is laterally displaced from first light entrance device 1820 in a direction generally perpendicular to first entrance face 1910a, such that light from high pressure mercury arc lamp 110 and lasers 112, 114 independently enter the body 1810 via light entrance devices 1820 and 1830, the light exiting light egress end 1815. Hence, each light entrance device 1820 and 1830 each occupies about half the cross-sectional area of integrator 116.

In some implementations, light egress end 1815 is enabled for one of abutment to, or insertion into, an input region of an optional hollow tunnel 1860 which comprises planar interior mirrored wall surfaces for extending the light egress end 1815 to a focal plane which is beyond the light egress end 1815 of integrator 116, such that the length L may be shortened. An example of hollow tunnel 1860 is disclosed in Applicant's U.S. Pat. No. 6,205,271, incorporated herein by reference. It is appreciated that when hollow tunnel 1860 is present (as depicted in FIGS. 2 and 3), output 230 is at an output of hollow tunnel 1860, otherwise output 230 is coincident with light egress end 1815.

It is further appreciated that while integrator 116 comprises two light entrance faces, the number of entrance faces is not to be considered particularly limiting, and any suitable number of entrance faces is within the scope of present implementations. Furthermore, it is appreciated that integrator 116 is to be considered merely exemplary, and that any suitable integrator is within the scope of present implementations. Examples of integrators with three and four entrance faces are disclosed in detail in Applicant's US Patent Application having Patent No. US 2009-0168448, and are within the scope of present implementations. However it is appreciated that suitable integrators other than those disclosed in Applicant's US Patent Application having Patent No. US 2009-0168448 are within the scope of present implementations.

Figure 4:
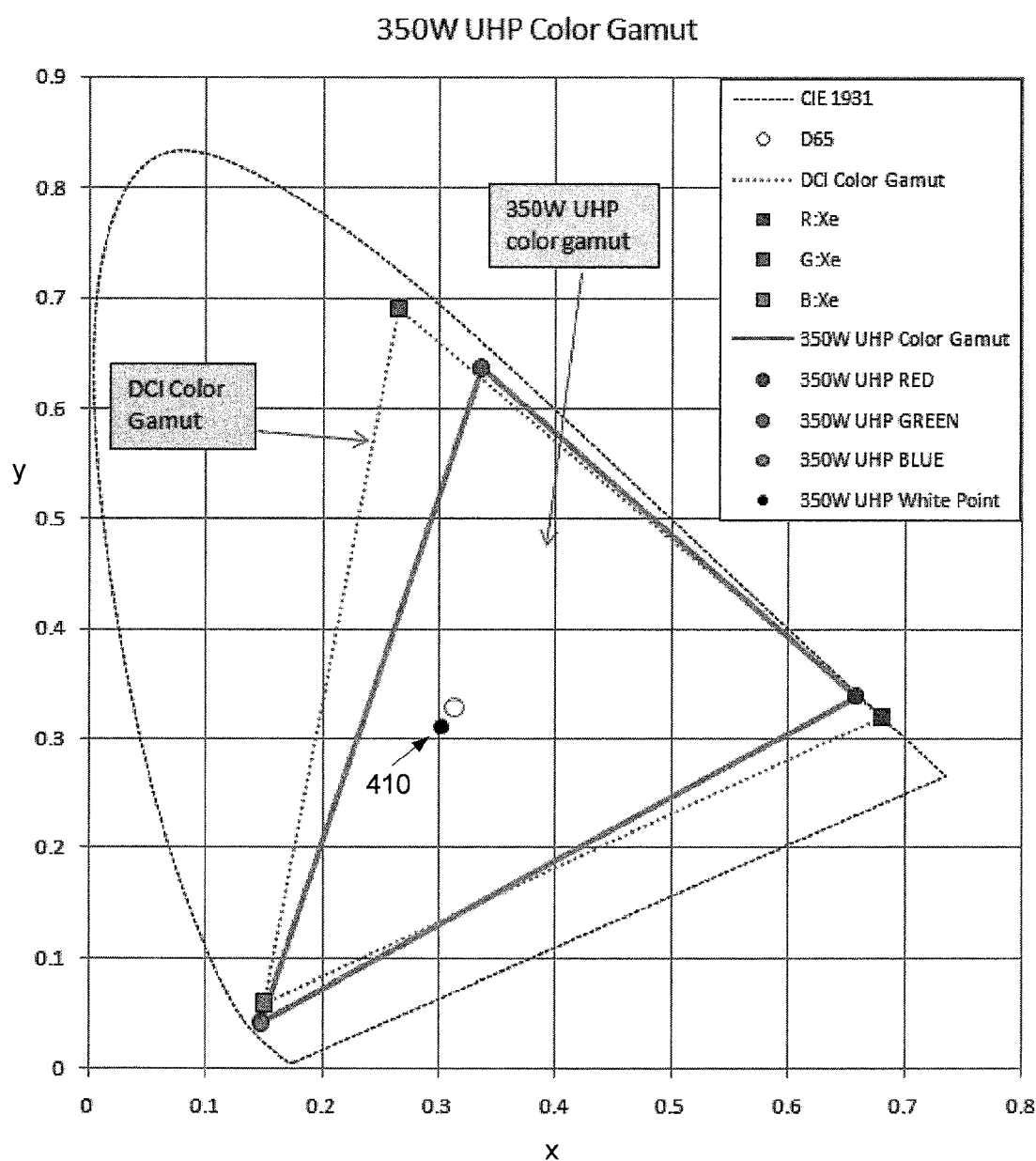
FIG. 4 depicts a 1931 CIE color chart showing a DCI color gamut and a given 350 W high pressure mercury arc lamp (UHP™)-based projector color gamut, according to non-limiting implementations.

In any event, attention is directed to FIG. 4, which depicts a CIE (Commission internationale de l'éclairage or International Commission on Illumination) 1931 color space with the color gamut of a typical 350 Watt UHP™ high pressure mercury arc lamp-based projector of the prior art depicted thereon, as represented by the circles at the three corners. The CIE 1931 color chart of FIG. 4 also comprises the color gamut of the DCI (Digital Cinema Initiative) color gamut, which is a specification set by the DCI for digital projectors, as indicated by the squares. It is appreciated from FIG. 4 that the high pressure mercury arc lamp based projector is deficient in both red and green and therefore cannot display the full range of colour specified by the DCI. It is further understood that the DCI has specified that the white point of a digital projector should be approximately equal to CIE Standard Illuminant D65, and that the high pressure mercury arc lamp-based projector color temperature is high (approximately 7385K, i.e. black dot 410) and not at D65.

Figure 5:
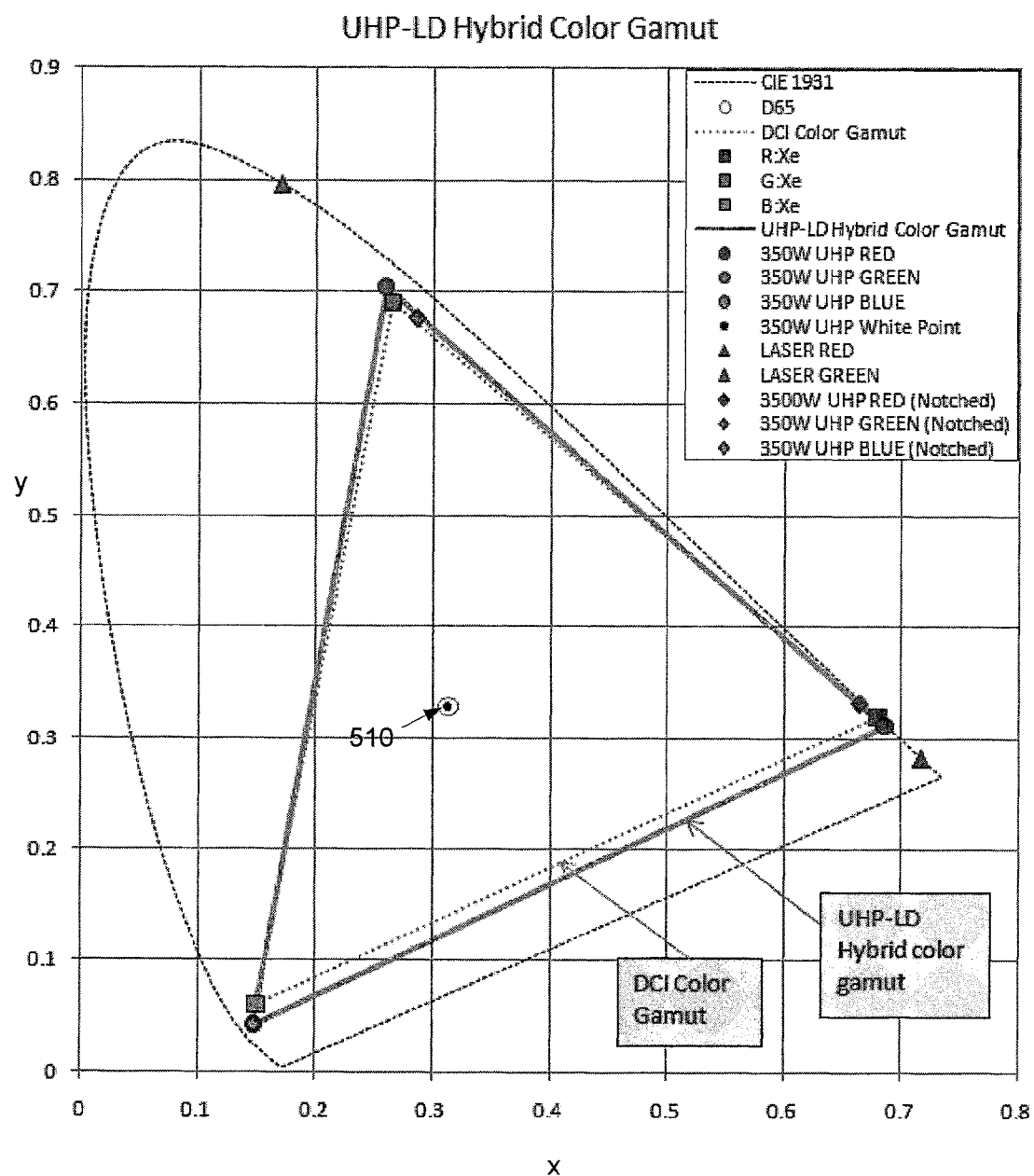
FIG. 5 depicts a 1931 CIE color chart showing a DCI color gamut and a hybrid high pressure mercury arc lamp-laser light projector color gamut (using a given UHP™ lamp), according to non-limiting implementations.

However, attention is next directed to FIG. 5, which depicts a CIE 1931 color space with the DCI color gamut depicted thereon (squares), as well as the color gamut of digital projector 100 (as represented by the circles at the three corners). It is appreciated from FIG. 5 that the DCI color gamut is inside the color gamut of digital projector 100, and hence digital projector 100 exceeds the DCI specification.

Figure 6:
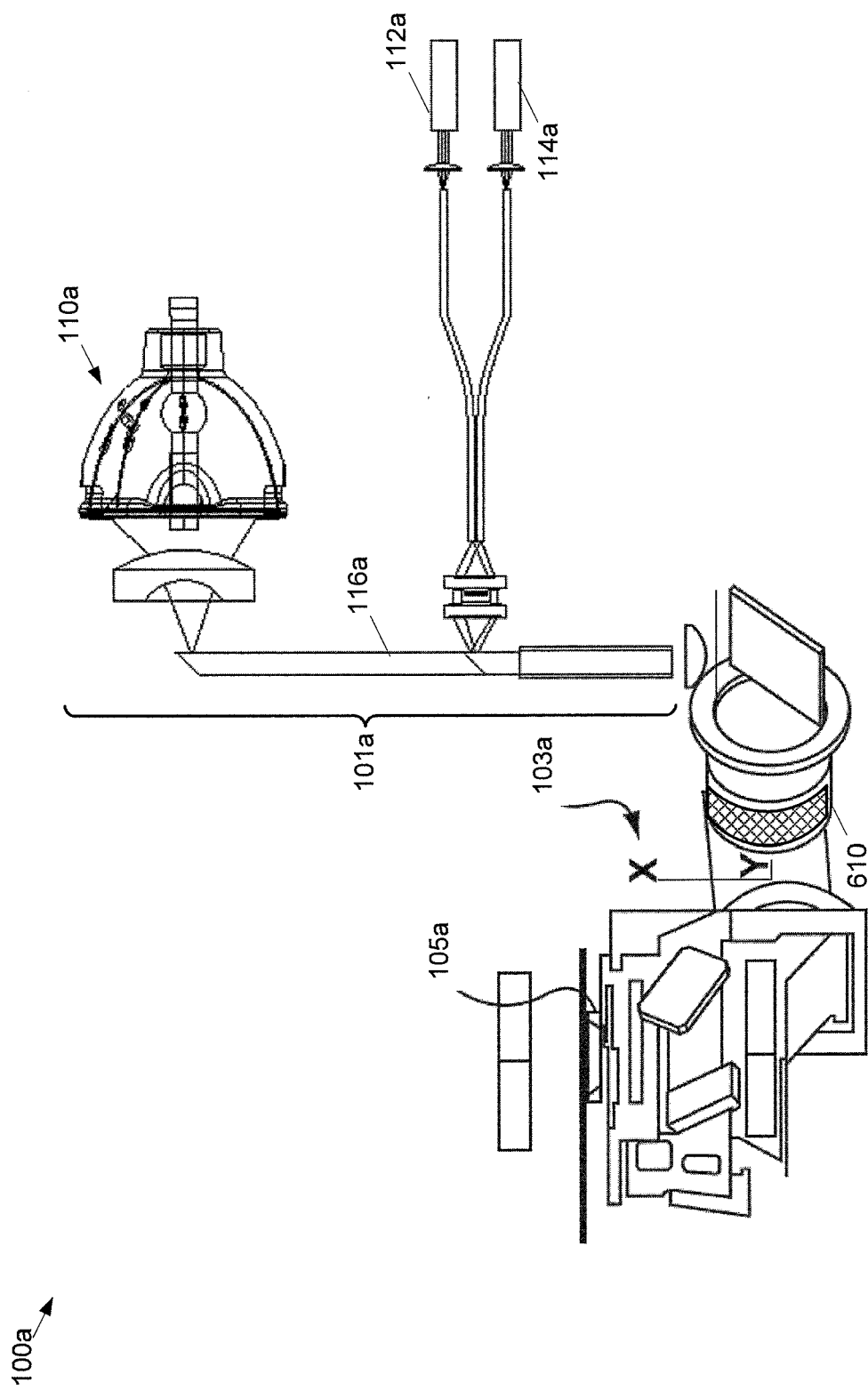
FIG. 6 depicts a digital projector having a hybrid high pressure mercury arc lamp-laser light production system, according to non-limiting implementations.
Figure 7:
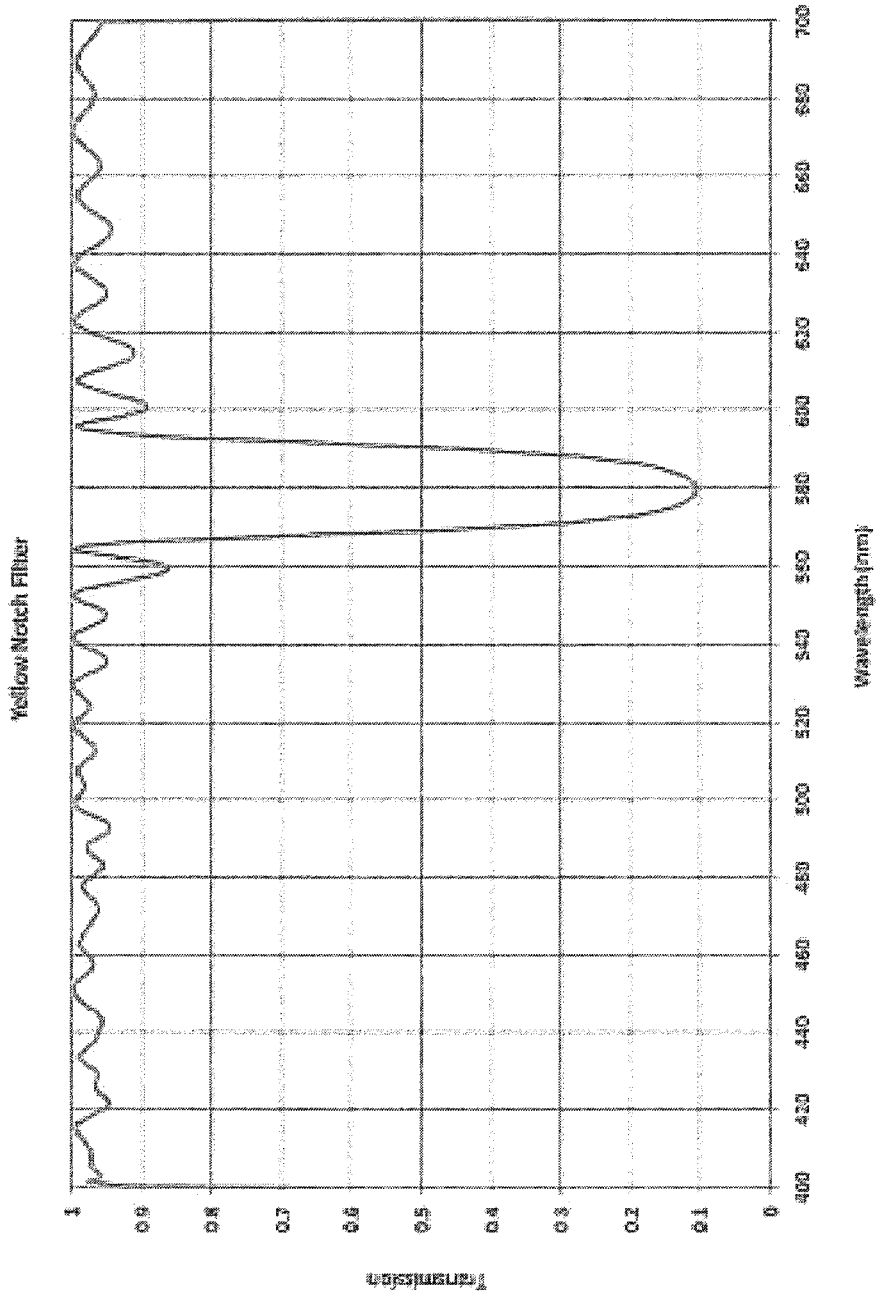
FIG. 7 depicts a transmission profile for a yellow notch filter, according to non-limiting implementations.

FIG. 5 also depicts the color gamut of a digital projector 100a as depicted in FIG. 6, as represented by the circles at the three corners. FIG. 6 is substantially similar to FIG. 1, with like elements having like numbers, however with an "a" appended thereto. For example, digital projector 100a is similar to digital projector 100. However digital projector 100a further comprises a yellow notch filter 610 in illumination relay optics 103a. The transmission profile of yellow notch filter 610 is depicted in FIG. 7. It is appreciated from FIG. 7 that light centered about approximately 580 nm (i.e. yellow light), with bandwidth of approximately 20 nm, is not transmitted by yellow notch filter 610. Hence, yellow light is removed from the combined light emitted from integrator 116a. Specifically, yellow notch filter 610 causes the white point of digital projector 100a to shift to D65 by removing an excess of yellow light emitted by high pressure mercury arc lamp 110a. Indeed, it is appreciated that the 350 W high pressure mercury arc lamp white point 510 depicted in FIG. 5 is the white point of digital projector 100a. It is appreciated that the color gamut of digital projector 100a of FIG. 5 assumes that high pressure mercury arc lamp 110a comprises a given 350 W UHP™ lamp.

It is further appreciated that, while in depicted implementations yellow notch filter 601 is located in illumination relay optics 103a (e.g. in an illumination optical module), in other implementations, yellow notch filter 610 can be at least one of an output of integrator 116a, between high pressure mercury arc lamp 110a and an entrance to integrator 116a (i.e. the entrance for light from the at least one high pressure mercury arc lamp 110) and in any other suitable location for filtering yellow from light from the at least one high pressure mercury arc lamp 110.

In order to demonstrate the performance of the light production systems 101, 101a, non-limiting simulation was performed, the light and electrical budgets of which are provided in Table 1:

TABLE 1

| | High Pressure Mercury Arc Lamp | | | Laser | | |
|---|---|---|---|---|---|---|
| | Red | Green | Blue | Red | Green | Total |
| Screen Luminous Flux (lumens) | 739 | 2774 | 286 | 433 | 983 | 5215 |
| Optical Power on Screen (W) | 3.89 | 4.72 | 6.38 | 3.32 | 1.63 | 20 |
| Electrical Power (W) | | 350 | | 55.3 | 77.5 | 483 |
| Number of Sources | | 1 | | 3 | 2 | 6 |

Hence, with one 350 W high pressure mercury arc lamp, 3 red and 2 green lasers, this projector can deliver 5215 ANSI lumens, with a centre luminous flux of about 6,000 center lumens on screen.

The simulation provided in Table 1 is based on an assumption of 70% transmission loss, and quantum efficiencies of 20% and 7% for red lasers 112 and green lasers 114 respectively, and that each red laser 112 produces 5 W of optical power and that each green laser 114 produces 3 W of optical power.

In any event, it is appreciated from Table 1 that 5215 lumens are produced for 483 W. A Xe-lamp based projector will produce a similar number of lumens for about 800 W hence a power savings of approximately 40% is achieved over the prior art with present implementations. Furthermore, digital projector 100*a* further meets the requirements of a 6000 ANSI (American National Standards Institute) lumen cinema projector.

Figure 8:
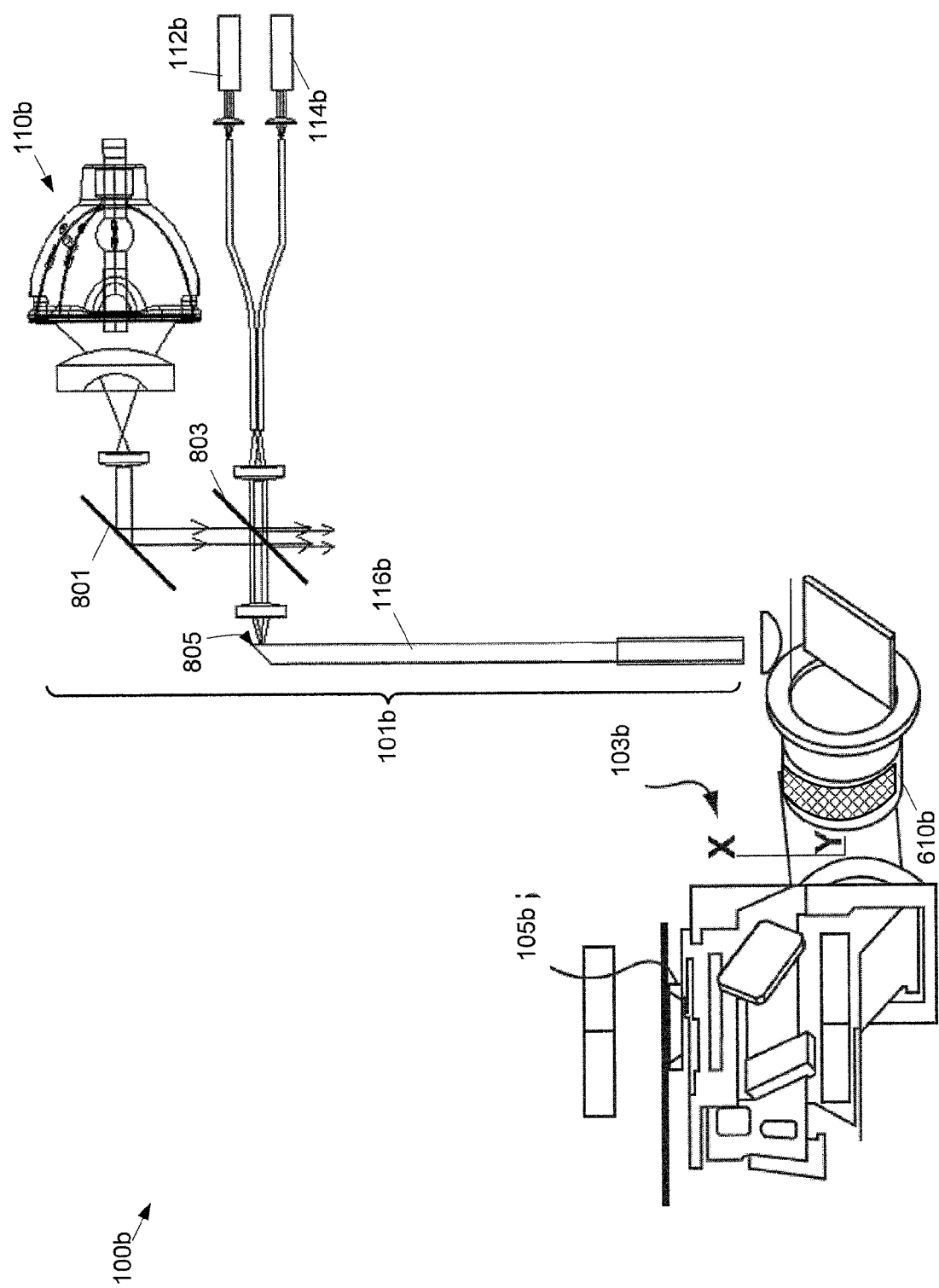
FIG. 8 depicts a digital projector having a hybrid high pressure mercury arc lamp-laser light production system, according to non-limiting implementations.

Attention is directed to FIG. 8, which depicts a digital projector 100*b*, according to non-limiting implementations. FIG. 8 is substantially similar to FIG. 6, with like elements having like numbers, however with a "b" appended thereto. For example, digital projector 100*b* is substantially similar to digital projector 100*a*, however light production system 101*b* includes a fold mirror 801 and a double notch filter 803 for combining light from high pressure mercury arc lamp 110*b*, red lasers 112*b* and green lasers 114*b* at a single entrance face of integrator 116*b*. Indeed, it is appreciated that, in these implementations, integrator 116 has a single entrance face 805, similar to entrance face 1910*a*.

Figure 9:
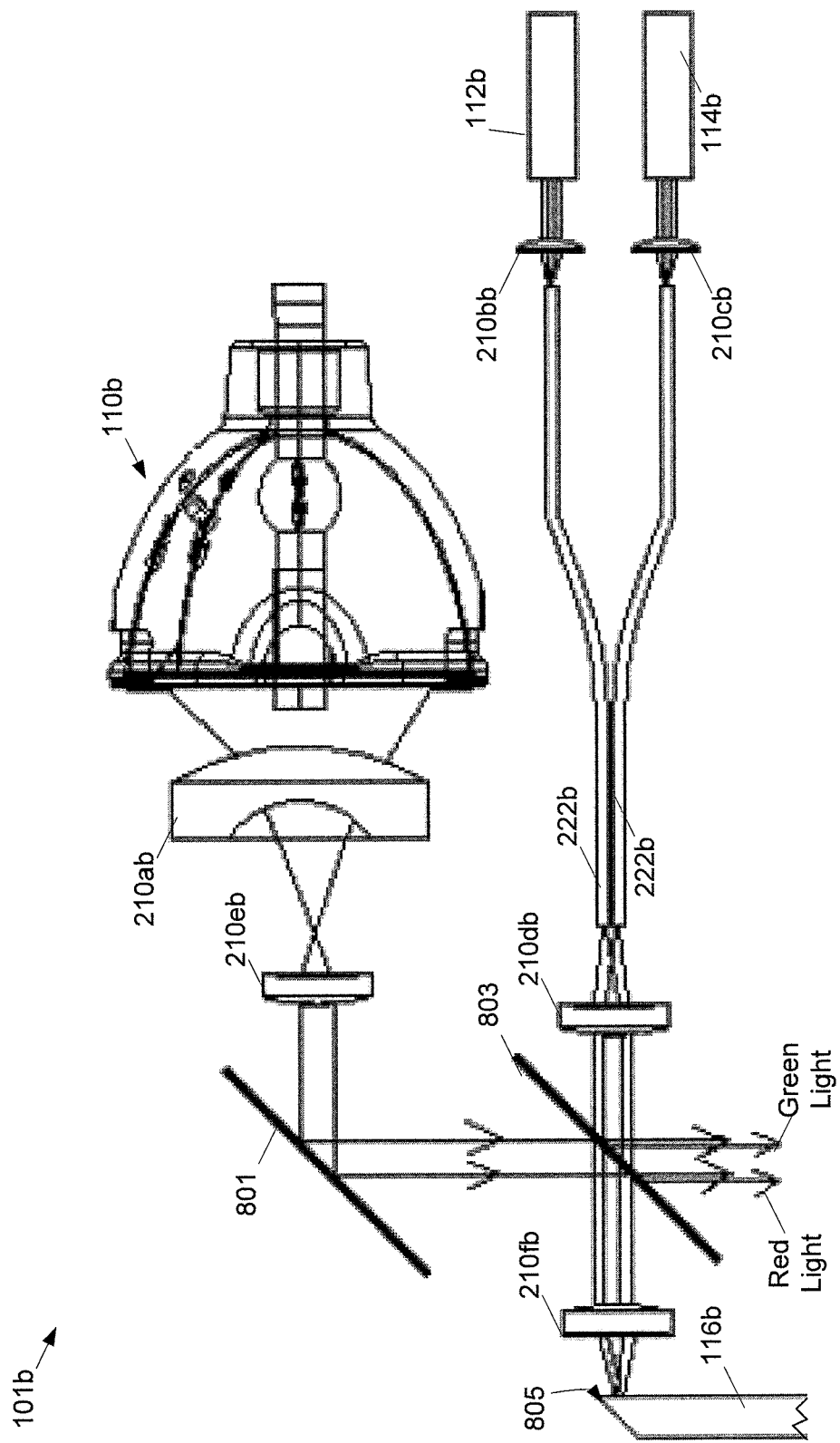
FIG. 9 depicts a hybrid high pressure mercury arc lamp-laser light production system, according to non-limiting implementations, according to non-limiting implementations.

Light production system 101*b* is depicted in further detail in FIG. 9, and further comprises fibre optics 222*b*, similar to fibre optics 222 and lenses 210*ab*, 210*bb*, 210*cb*, respectively similar to lenses 210*a*, 210*b*, 210*c*. Further, lenses 210*db*, 210*eb* are enabled to receive light having a cone angle from fibre optics 222*b* and lens 210*ab*, respectively, and collimate the light for respective impingement on double notch filter 803 and fold mirror 801. Lens 210*fb* is enabled to receive collimated light from double notch filter 803 and focus the collimated light onto entrance face 805. Fold mirror 801 is enabled to receive collimated light high pressure mercury arc lamp 110*b* and reflect the collimated light onto double notch filter 803.

Figure 10:
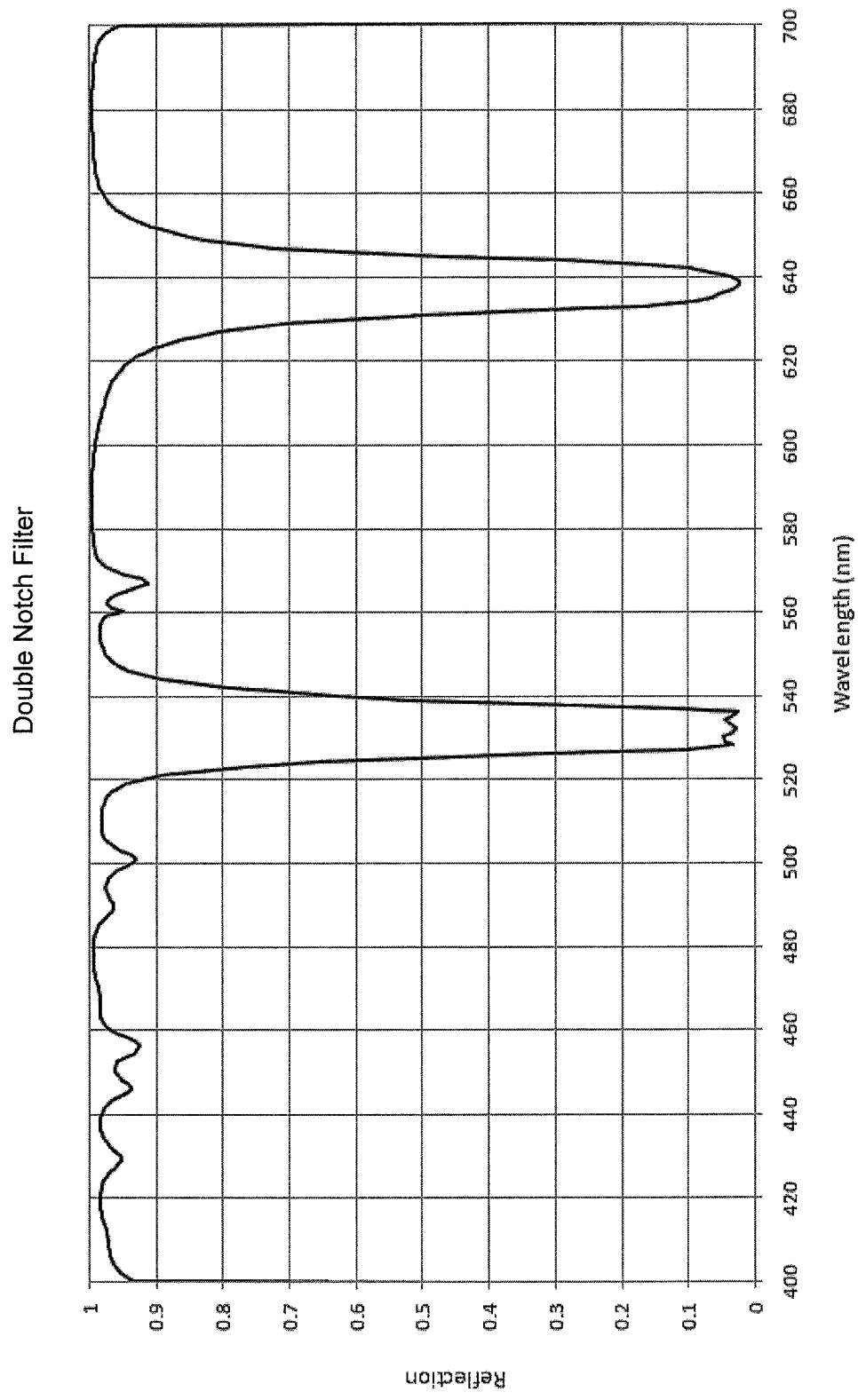
FIG. 10 depicts a reflection profile for a red and green double notch filter, according to non-limiting implementations.

Double notch filter 803 is proximal to entrance face 805, and enabled to receive and transmit light from red laser 112*b* and green laser 114*b*. For example, the reflection profile of double notch filter 803 is depicted in FIG. 10. It is appreciated from FIG. 10 that double notch filter 803 comprises two band pass regions, one for red light and one for green light. Hence, light centered about approximately 638 nm (i.e. red light), with bandwidth of approximately 20 nm, is transmitted by double notch filter 803. Further, Hence, light centered about approximately 532 nm (i.e. green light), with bandwidth of approximately 20 nm, is transmitted by double notch filter 803. Light outside these two band pass regions is reflected. Hence, double notch filter 803 comprises a first band pass for receiving and transmitting red light and a second band pass for receiving and transmitting green light, and substantially reflecting light outside of each of the first band pass and the second band pass.

Hence, returning to FIG. 9, collimated light from high pressure mercury arc lamp 110*b* that is reflected from fold mirror 801 onto double notch filter 803 is reflected into entrance face 805, except for red light and green light defined by the first and second band passes of double notch filter 803, which is transmitted by double notch filter 803.

While red and green light from high pressure mercury arc lamp 110*b* is sacrificed in light production system 101*b*, the high power laser injection not only overcomes the loss, but also increases the light intensity with saturated colors resulting in a wider color gamut, for example see the colour gamut of digital projector 100*b* as represented in FIG. 5 by the circles at each corner.

For example, red and green light from lasers 112*b*, 114*b* impinges on double notch filter 803 from a side opposite that of light from high pressure mercury arc lamp 110*b*, the red and green light from lasers 112*b*, 114*b* passing through double notch filter 803 and into entrance face 805, hence compensating for the loss in red and green light from high pressure mercury arc lamp 110*b*.

Indeed, is it further appreciated that fold mirror 801 is enabled to reflect light from high pressure mercury arc lamp 110*b* towards double notch filter 803 and that fold mirror 801, double notch filter 803 and entrance face 805 are arranged relative to one another such that red light and said green light from respective lasers 112*b*, 114*b* pass through double notch filter 803 and into entrance face 805, and light from the at least one high pressure mercury arc lamp 110 outside of the first band pass and the second band pass is reflected from double notch filter 803 and into entrance face 805. For example, in depicted implementations, this is accomplished by arranging double notch filter at a 45° angle to entrance face 805, a fold mirror facing side of double notch filter 803 being on a same side as entrance face 805, and arranging fold mirror 801 above and parallel to double notch filter 803 such that light from high pressure mercury arc lamp 110*b* is reflected onto the fold mirror facing side of double notch filter 803 at a 45° angle and reflected 90° into entrance face 805.

With this arrangement, a second entrance face is eliminated from integrator 116*b* and performance similar to light production systems 101, 101*a* is achieved.

It is further appreciated that double notch filter 803 and yellow notch filter 601 can each comprise suitable dichroic and/or thin film interference filters designed with the appropriate respective reflection and/or transmission profiles.

Figure 11:
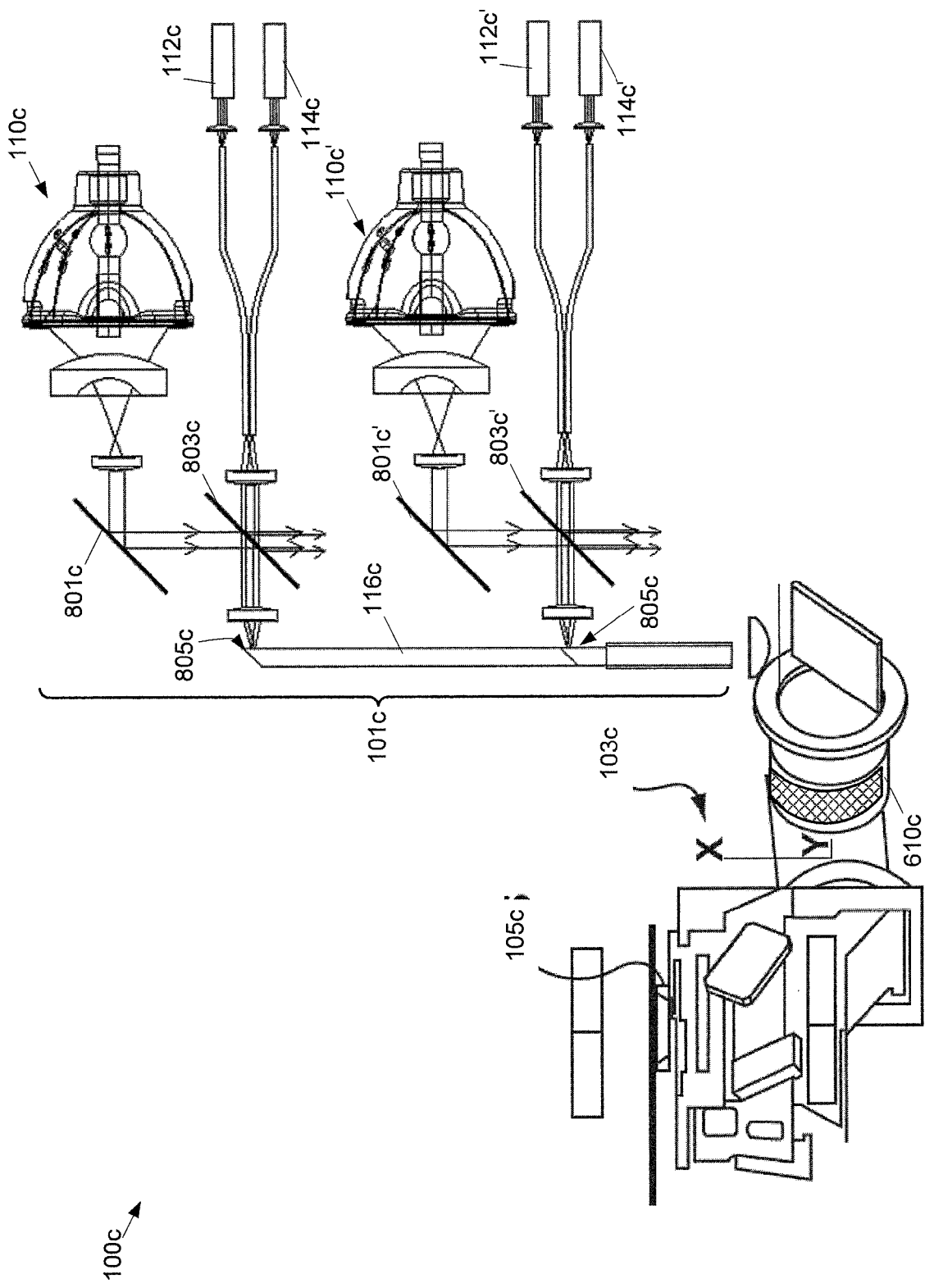
FIG. 11 depicts a digital projector having a hybrid high pressure mercury arc lamp-laser light production system, according to non-limiting implementations.

Attention is now directed to FIG. 11, which depicts a digital projector 100*b*, according to non-limiting implementations. FIG. 11 is substantially similar to FIG. 9, with like elements having like numbers, however with a "c" appended thereto. For example, digital projector 100*c* is substantially similar to digital projector 100*b*, however light production system 101*b* includes a second entrance face 805*c* at integrator 116*c*, similar to entrance face 1910*b*, a second fold mirror 801*c'*, a second double notch filter 803*c'* for combining light from a second high pressure mercury arc lamp 110c', second red lasers 112c' and second green lasers 114c'. Indeed, it is appreciated that fold mirror 801c', double notch filter 803c, high pressure mercury arc lamp 110c', red lasers 112c' and second green lasers 114c', are all respectively similar to fold mirror 801c, double notch filter 803c, high pressure mercury arc lamp 110c, red lasers 112c and second green lasers 114c, and are further more arranged in a similar manner, as described above with reference to FIG. 9.

Indeed, it is appreciated that light production system 101c has double the light output as compared to light production system, 101b by doubling the number of high pressure mercury arc lamps and associated components. Indeed, it is appreciated that the light can be further increased by providing a respective double notch filter, a respective fold mirror, at least one respective red laser, at least one respective green laser, and at least one respective entrance at a suitable integrator for each high pressure mercury arc lamp that is to be used.

In order to demonstrate the performance of the light production systems 101c, non-limiting simulation was performed, the light and electrical budgets of which are provided in Table 2:

TABLE 2

|  | High Pressure Mercury Arc Lamp | | | Laser | | |
|---|---|---|---|---|---|---|
|  | Red | Green | Blue | Red | Green | Total |
| Screen Luminous Flux (lumens) | 1293 | 4390 | 550 | 994 | 2888 | 10114 |
| Optical Power on Screen (W) | 6.48 | 7.51 | 12.40 | 7.61 | 4.78 | 39 |
| Electrical Power (W) |  | 700 |  | 126.8 | 227.5 | 1054 |
| Number of Sources |  | 2 |  | 6 | 6 | 14 |

Furthermore, the center luminous flux is about 11,000 lm.

The simulation provided in Table 2 is based on an assumption of 70% transmission loss, and quantum efficiencies of 20% and 7% for red lasers 112 and green lasers 114 respectively, and that each red laser 112 produces 5 W of optical power and that each green laser 114 produces 3 W of optical power.

In any event, it is appreciated from Table 2 that 10114 lumens are produced for 1054 W. A Xe-lamp based projector will produce a similar number of lumens for about 1520 W, hence a power savings of approximately 40% is achieved over the prior art with present implementations.

It is appreciated that the simulation of Table 2 is based on each high pressure mercury arc lamp 110c, 110c' comprising a 350 W high pressure mercury arc lamp. In order to demonstrate the performance of the light production systems 101c, when each high pressure mercury arc lamp 110c, 110c' comprising a 450 W high pressure mercury arc lamp, a non-limiting simulation was performed, the light and electrical budgets of which are provided in Table 3:

TABLE 3

|  | High Pressure Mercury Arc Lamp | | | Laser | | |
|---|---|---|---|---|---|---|
|  | Red | Green | Blue | Red | Green | Total |
| Screen Luminous Flux (lumens) | 1662 | 5644 | 708 | 1278 | 3713 | 13004 |
| Optical Power on Screen (W) | 8.33 | 9.66 | 15.94 | 9.78 | 6.14 | 50 |
| Electrical Power (W) |  | 900 |  | 163.1 | 292.5 | 1356 |
| Number of Sources |  | 7 |  | 7 | 7 | 16 |

Furthermore, the center luminous flux is about 14,000 lumens.

The simulation provided in Table 3 is based on an assumption of 70% transmission loss, and quantum efficiencies of 20% and 7% for red lasers 112 and green lasers 114 respectively, and that each red laser 112 produces 5 W of optical power and that each green laser 114 produces 3 W of optical power.

In any event, it is appreciated from Table 3 that 13004 lumens are produced for 1356 W. A Xe-lamp based projector will produce a similar number of lumens for about 1520 W, hence a power savings of approximately 40% is achieved over the prior art with present implementations. In addition, as the power requirements Hence, a High Pressure Mercury Arc Lamp-LD (laser diode) hybrid digital projector provides an energy efficient, safe, compact and cost effective projector.

Figure 12:
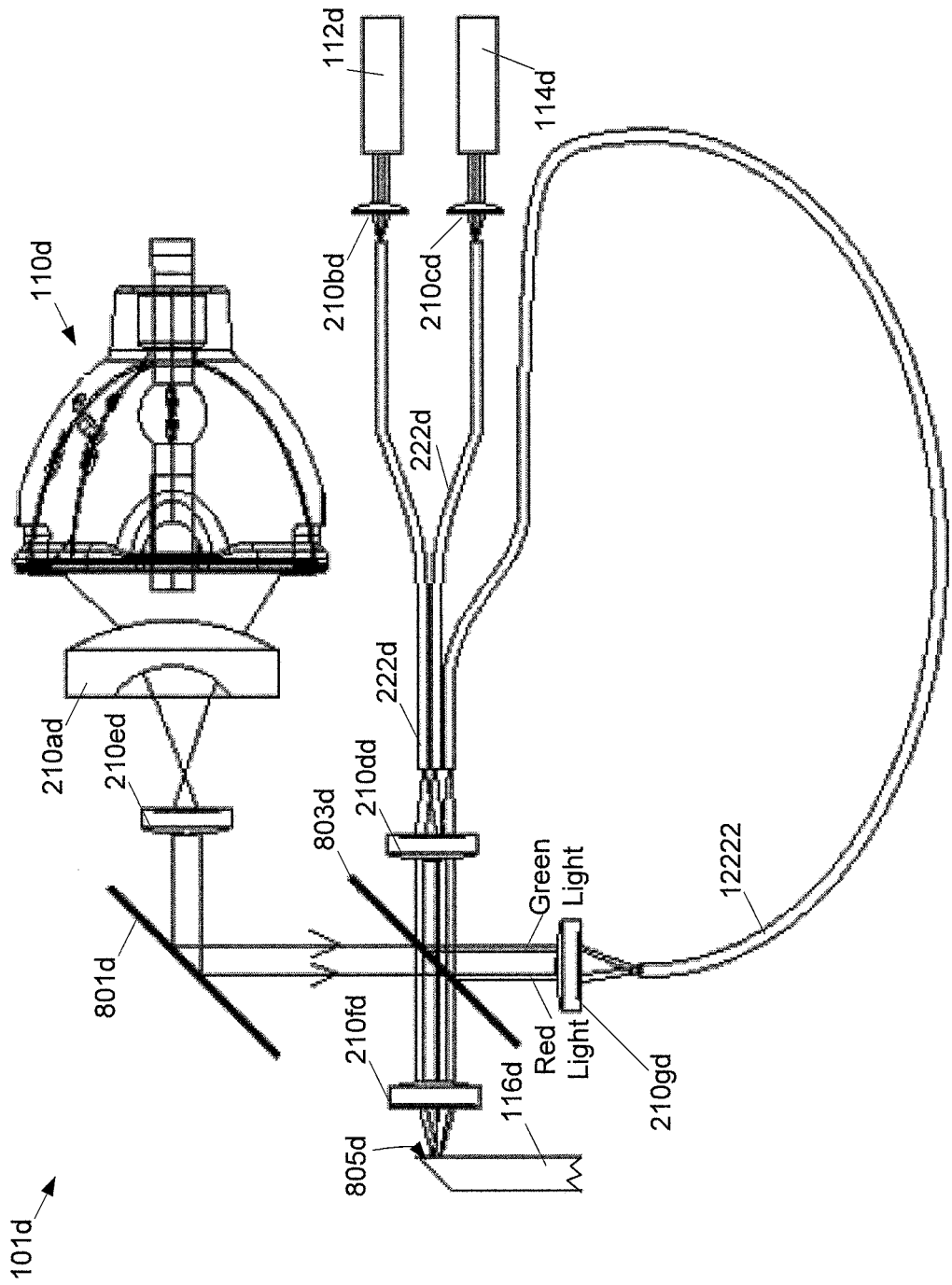
FIG. 12 depicts a hybrid high pressure mercury arc lamp-laser light production system, according to non-limiting implementations.

Attention is now directed to FIG. 12, which is substantially similar to FIG. 9, with like elements having like numbers, but with a "d" appended thereto. However, light production system 101d further comprises an optical apparatus 1222 for receiving red and green light from the at least one high pressure mercury arc lamp 110 transmitted by double notch filter 803d and relaying the red and green light back through double notch filter 803d and into entrance face 805d. Lens 210gd is enabled to focus red and green light from the at least one high pressure mercury arc lamp 110 transmitted by double notch filter 803d into optical apparatus 1222. Hence, red and green light from high pressure mercury arc lamp 110d is not discarded and the intensities of lasers 112d, 114d can be reduced to compensate for the increase in red and green light at entrance face 805d, and the overall optical efficiency of light production system 101d is increased.

In depicted implementations, optical apparatus 1222 comprises at least one optical fibre which relays the red and green light from high pressure mercury arc lamp 110d to lens 210dd, which collimates light from optical apparatus 1222 and fibre optics 222d onto double notch filter 803d. However, in other implementations, optical apparatus can comprise an arrangement of mirrors, any suitable combination of fibre optic, mirrors and lenses, or any other suitable optical apparatus.

It is further appreciated that light production system, 101c of FIG. 11 can be adapted to recycle red and green light from each high pressure mercury arc lamp 110c, 110c' by using an optical apparatus similar to optical apparatus 1222, or the like, for each high pressure mercury arc lamp 110c, 110c'.

It is further appreciated that further filtering and/or colour shifting of light produced by any of light production systems 101, 101a, 101b, 101c, 101d can occur in the digital projector which is receiving the light. For example, any of illumination relay optics 103, 103a, 103b, 103c can comprise at least one of a dichroic filter and a bandpass filter for further filtering light.

It is further appreciated that by adjusting relative intensities of high pressure mercury arc lamps to red and green lasers, numbers of high pressure mercury arc lamps, numbers of red and green lasers, and by providing various suitable filters, a wide variety of High Pressure Mercury Arc Lamp-LD (laser diode) hybrid digital projectors having different intensities, color gamuts, and color temperatures can be produced.

Hence, High Pressure Mercury Arc Lamp-LD (laser diode) Hybrid Digital Cinema Projectors can be produced which are cost effective, compact, have low power consumption and are DCI-compliant cinema projector. With a single high pressure mercury arc lamp, 2 green and 3 red lasers, a 6000 ANSI lumen cinema projector can be produced. Higher power High Pressure Mercury Arc Lamp-LD Hybrid cinema projectors can be made with the incorporation of a double notch filter which can deliver about 14,000 center lumens on the screen and is energy safe, more compact and more cost effective than the prior art. Furthermore, the laser diode lasers used herein can provide saturated colors and long life (more than 10,000 hours). When comparing the High Pressure Mercury Arc Lamp-LD (laser diode) Hybrid Digital Cinema Projectors described herein with projectors based solely on red, green and blue lasers, present implementations are cheaper, have low luminous efficacy and use less cooling. Furthermore, while it is appreciated that present implementations have been described with reference to digital projectors, the hybrid light production systems described herein could also be applied to analog projectors.

Persons skilled in the art will appreciate that there are yet more alternative implementations and modifications possible, and that the above implementations and examples are only illustrations of one or more embodiments. The scope, therefore, is only to be limited by the claims appended hereto.

What is claimed is:

1. A light production system for a projector comprising:
at least one high pressure mercury arc lamp;
at least one red laser;
at least one green laser;
an integrator for receiving and combining light from said at least one high pressure mercury arc lamp, red light from said at least one red laser and green light from said at least one green laser, said integrator comprising an output enabled to emit combined light into illumination relay optics of said projector;
a double notch filter proximal to an entrance of said integrator, said double notch filter comprising a first band pass for receiving and transmitting said red light and a second band pass for receiving and transmitting said green light, and substantially reflecting given light outside of each of said first band pass and said second band pass; and,
a fold mirror for reflecting said light from said at least one high pressure mercury arc lamp towards said double notch filter, said fold mirror, said double notch filter and said entrance arranged relative to one another such that said red light and said green light passes through said double notch filter and into said entrance, and said light from said at least one high pressure mercury arc lamp outside of said first band pass and said second band pass reflected from said double notch filter and into said entrance.

2. The light production system of claim 1, wherein said integrator further comprises a first light entrance for receiving said light from said at least one high pressure mercury arc lamp, and at least a second light entrance for receiving said red light and said green light.

3. The light production system of claim 1, wherein said integrator further comprises at least one of an integrating rod and a hollow pipe with interior mirrored wall surfaces.

4. The light production system of claim 1, wherein each said red laser comprises a 638 nm laser and each said green laser comprises a 532 nm laser, and a ratio of said at least one red laser to said at least one high pressure mercury arc lamp is at least one of:
dependent on wattage of said at least one high pressure mercury arc lamp and power of the said least one red laser;
different than 1 to 1; and,
3 to 1, and
a ratio of said at least one green laser to said at least one high pressure mercury arc lamp is at least one of:
dependent on said wattage of said at least one high pressure mercury arc lamp and power of the said least one green laser;
different than 1 to 1;
2 to 1; and
3 to 1.

5. The light production system of claim 1, wherein each said red laser comprises a 638 nm laser and each said green laser comprises a 532 nm laser.

6. The light production system of claim 1, further comprising a first fibre optic cable for routing said red light from said red laser to said integrator and a second fibre optic cable for routing said green light from said green laser to said integrator.

7. The light production system of claim 1, further comprising a respective double notch filter, a respective fold mirror, at least one respective red laser, at least one respective green laser, and at least one respective entrance at said integrator for each of said at least one high pressure mercury arc lamps.

8. The light production system of claim 1, further comprising an optical apparatus for receiving said light from said at least one high pressure mercury arc lamp transmitted by said double notch filter and relaying said light from said at least one high pressure mercury arc lamp transmitted by said double notch filter back through said double notch filter and into said entrance.

9. The light production system of claim 1, further comprising a yellow filter for reducing yellow light from said at least one high pressure mercury arc lamp.

10. The light production system of claim 1, wherein said illumination relay optics comprise at least one of a dichroic filter and a bandpass filter for further filtering said combined light.

11. The light production system of claim 8, wherein said optical apparatus comprises at least one of:
at least one optical fibre;
an arrangement of mirrors; and,
an arrangement of lenses.

12. The light production system of claim 9 wherein said yellow filter is located at one or more of said output, between said at least one high pressure mercury arc lamp and an entrance to said integrator, and in said illumination relay optics.

13. A projector comprising:
- a light production system comprising:
    - at least one high pressure mercury arc lamp;
    - at least one red laser;
    - at least one green laser;
    - an integrator for receiving and combining light from said at least one high pressure mercury arc lamp, red light from said at least one red laser and green light from said at least one green laser, said integrator comprising an output enabled to emit combined light;
    - a double notch filter proximal to an entrance of said integrator, said double notch filter comprising a first band pass for receiving and transmitting said red light and a second band pass for receiving and transmitting said green light, and substantially reflecting given light outside of each of said first band pass and said second band pass;
    - a fold mirror for reflecting said light from said at least one high pressure mercury arc lamp towards said double notch filter, said fold mirror, said double notch filter and said entrance arranged relative to one another such that said red light and said green light passes through said double notch filter and into said entrance, and said light from said at least one high pressure mercury arc lamp outside of said first band pass and said second band pass is reflected from said double notch filter and into said entrance;
- illumination relay optics for receiving said combined light from said integrator;
- an imaging component for receiving said combined light from said illumination relay optics and causing said combined light to be formed into an image, said illumination relay optics arranged to relay said combined light to said imaging component; and
    - at least one projection component for accepting said image from said imaging component and projecting said image.

14. The projector of claim 13, wherein said integrator further comprises a first light entrance for receiving said light from said at least one high pressure mercury arc lamp, and at least a second light entrance for receiving said red light and said green light.

15. The projector of claim 13, wherein each said red laser comprises a 638 nm laser and each said green laser comprises a 532 nm laser, and a ratio of said at least one red laser to said at least one high pressure mercury arc lamp is at least one of:
- dependent on wattage of said at least one high pressure mercury arc lamp and power of the said least one red laser;
- different than 1 to 1; and,
- 3 to 1, and a ratio of said at least one green laser to said at least one high pressure mercury arc lamp is at least one of:
- dependent on said wattage of said at least one high pressure mercury arc lamp and power of the said least one green laser;
- different than 1 to 1;
- 2 to 1; and
- 3 to 1.

16. The projector of claim 13, further comprising a respective double notch filter, a respective fold mirror, at least one respective red laser, at least one respective green laser, and at least one respective entrance at said integrator for each of said at least one high pressure mercury arc lamps.

17. The projector of claim 13, further comprising an optical apparatus for receiving said light from said at least one high pressure mercury arc lamp transmitted by said double notch filter and relaying said light from said at least one high pressure mercury arc lamp transmitted by said double notch filter back through said double notch filter and into said entrance.

18. The projector of claim 13, further comprising a yellow filter for reducing yellow light from said at least one high pressure mercury arc lamp, wherein said yellow filter is located at one or more of said output, between said at least one high pressure mercury arc lamp and an entrance to said integrator, and in said illumination relay optics.

* * * * *